UNITED STATES PATENT OFFICE.

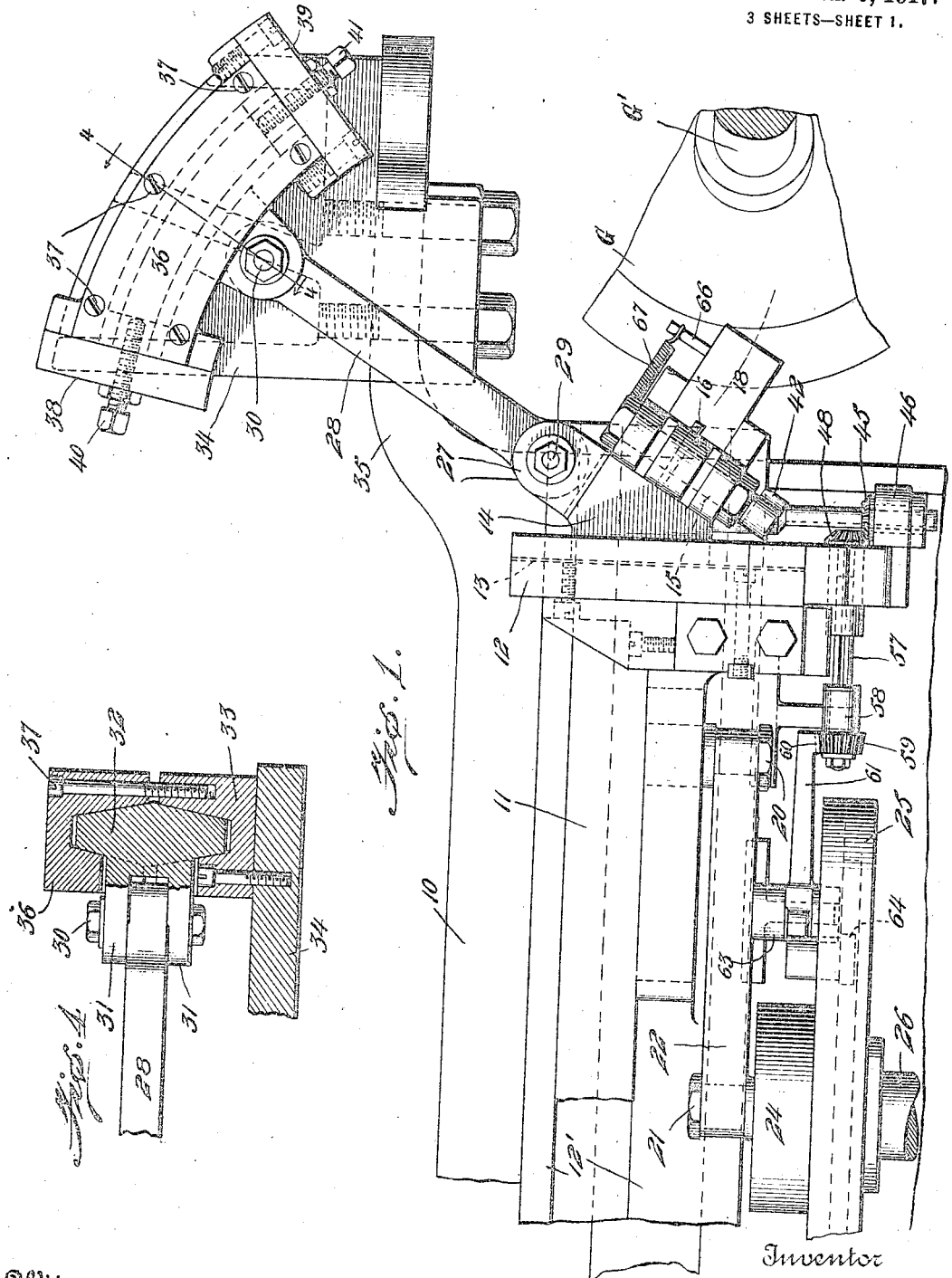

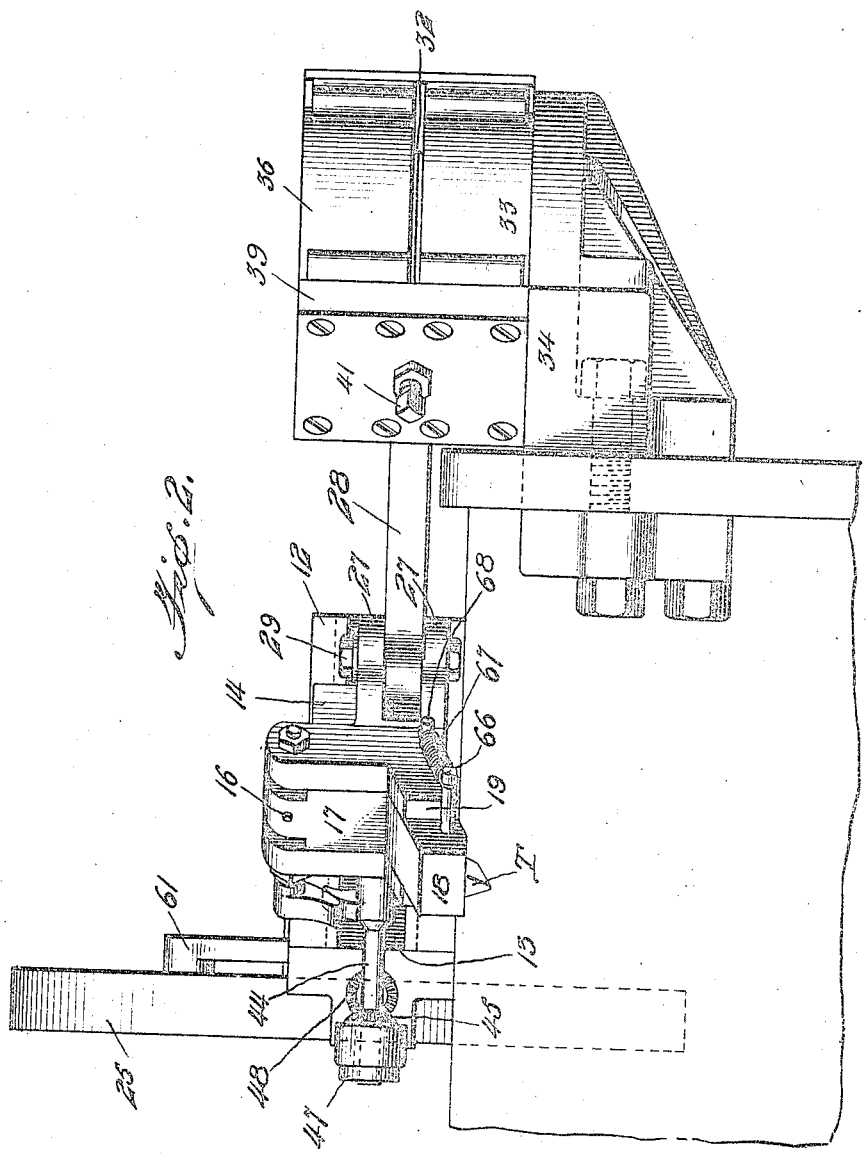

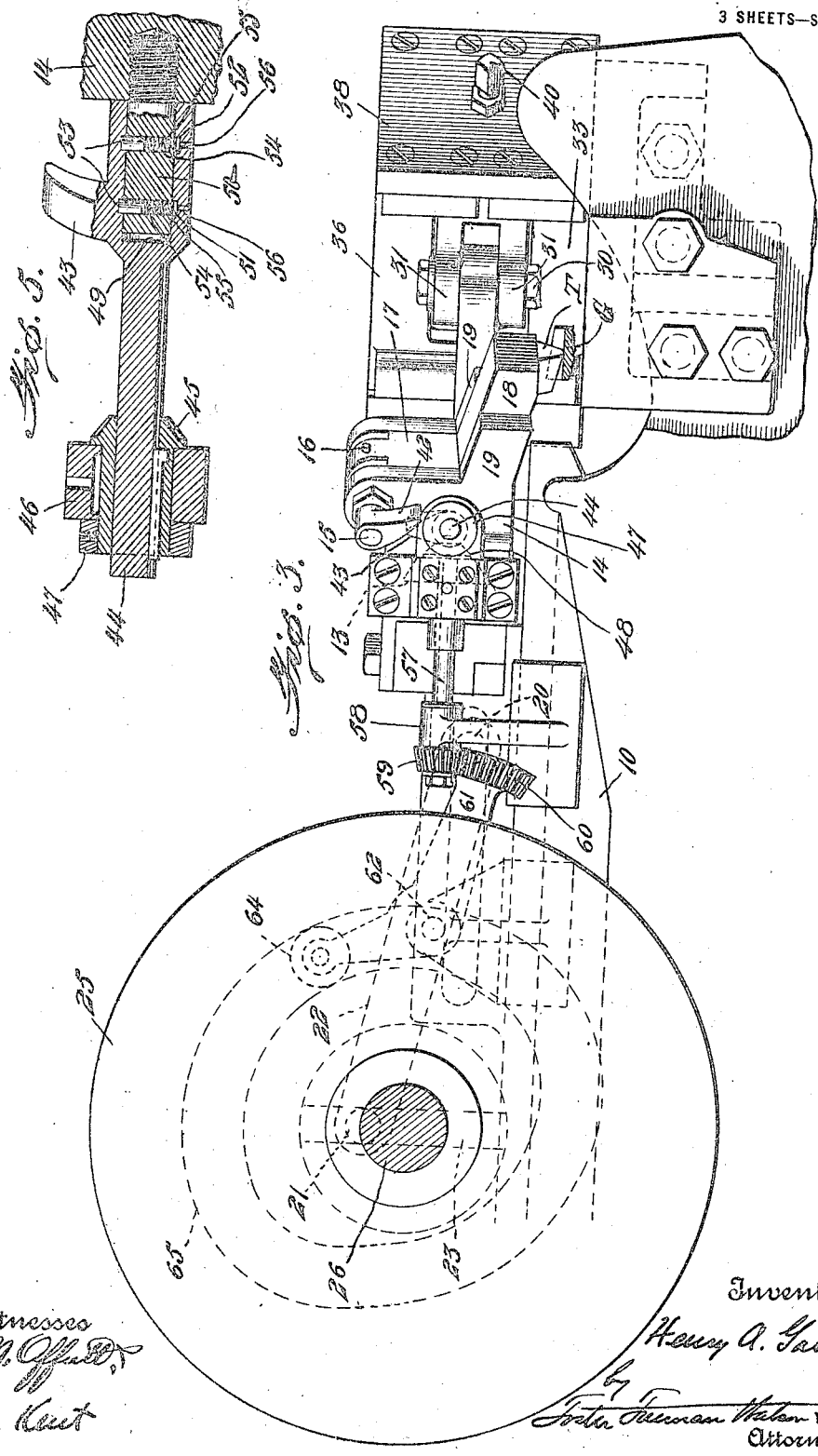

HENRY A. GARVEY, OF DETROIT, MICHIGAN, ASSIGNOR TO PACKARD MOTOR CAR COMPANY, OF DETROIT, MICHIGAN, A CORPORATION OF MICHIGAN.

GEAR-CUTTING MACHINE.

1,210,456.

Specification of Letters Patent.

Patented Jan. 2, 1917.

Application filed June 24, 1913. Serial No. 775,558.

*To all whom it may concern:*

Be it known that I, HENRY A. GARVEY, a citizen of the United States, and resident of Detroit, Wayne county, State of Michigan, have invented certain new and useful Improvements in Gear-Cutting Machines, of which the following is a specification.

This invention relates to gear cutting machines and more particularly to certain improvements whereby bevel gears having curved teeth are adapted to be cut on these machines.

One of the objects of the invention is to provide a simple, rigid construction for moving the tool accurately in a curved path.

Another object is to provide a construction which is not subject to excessive wear.

Another object is to provide a construction in which the angle of the teeth cut may be varied.

Other objects and the features of novelty will be apparent from the following description, taken in connection with the drawing, in which:

Figure 1 is a fragmentary plan view of the tool operating mechanism of a gear cutting machine embodying my improvements; Fig. 2 is a front elevation of the same; Fig. 3 is an elevation of the left hand side of Fig. 2; Fig. 4 is a fragmentary section on the line 4—4 of Fig. 1; and Fig. 5 is an enlarged sectional view of the shaft for lifting the tool on the return stroke.

Referring to the drawings, 10 indicates the bed of the machine on which slides a ram 11, suitable guides 12' being provided for the ram. At its forward end the ram 11 carries a head 12 having a slide-way 13 for a tool support 14, the slide-way being arranged at right angles to the direction of movement of the ram. Any suitable means may be provided for securing the tool support 14 in the slide-way 13 and for this purpose I prefer to use the usual dovetail on the tool support and form the slide-way to suit this dovetail, as indicated in dotted lines in Fig. 3. The tool support carries a rock shaft 15 which has secured thereto, by means of a pin 16, a tool holder 17. The tool holder 17 has a forwardly projecting arm 18 which carries the tool T and the arm 18 is arranged between suitable guides 19 on the tool support.

The ram 11 carries a wrist pin 20 which is operatively connected with a crank pin 21 by means of a connecting rod 22. The crank pin 21 is adjustably secured in any well known way in the transverse slot 23 in the end of the hub 24 of a driving wheel 25, this driving wheel being arranged on a driving shaft 26, which is supported in suitable bearings (not shown). The mechanism for reciprocating the ram 11, just described, is well known and forms no part of the present invention.

For the purpose of guiding the tool T in the arc of a circle I arrange on one side of the tool support 14 ears 27 to which an arm or link 28 is connected as by means of a suitable pivot pin 29. The arm or link 28 is also connected with a normally fixed pivot 30 which is arranged at one side of and slightly in advance of the pivot 29, as clearly shown in Fig. 1. The pivot 30 is carried by ears 31 on a wedge block 32, this wedge block being arc shaped and supported in a guide 33. The guide 33 is carried by a table 34 on a suitable bracket 35 secured to the frame 10. Above the guide 33 is a guide 36 which engages the block 32 and is adapted to be clamped against the latter by means of screws 37. The guides 33 and 36 are arc shaped, as shown in Fig. 1, and have secured thereto the end plates 38 and 39 which carry adjusting screws 40 and 41, respectively. These screws engage the ends of the block 32 and are for the purpose of adjusting the latter in the guides 33 and 36.

For the purpose of raising the tool out of the tooth space on the return stroke of the ram, I arrange on one end of the shaft 15 a finger 42 which is adapted to be engaged by a finger 43 on a shaft 44. From the drawings it will be obvious that when the shaft 44 is rocked the finger 42 will be lifted and thus rock the shaft 15. The arm 18 of the tool holder 17 will be lifted by rocking the shaft 15 and thereby carry with it the tool T, to a sufficient height to lift the latter out of the tooth space of the gear which is being cut, this gear being indicated in Fig. 3 at G, and being supported on a shaft G' which is carried by the frame of the machine and moved by any suitable mechanism to generate the teeth, an illustration of such mechanism being shown in U. S. Patent No. 665,054. The shaft 44 has one end splined in a gear 45, which is rotatably mounted in a suitable bearing 46 carried by the head 12 of the ram. The gear 45 is held in position in the bearing 46 by means of a suitable collar 47 and meshes with a bevel gear 48 which is also rotatably mounted in a suitable bearing in the head 12. The other end of the shaft 44 is provided with a recess 49 which receives a stud 50 carried by the tool support 14.

Owing to the sliding movement which the tool support 14 has relative to the head 12, it is necessary to spline the shaft 44 to the gear 45, and for the purpose of connecting the shaft 44 with the stud 50 in such a manner as to permit rotation of the shaft relative to the stud, I provide the recess 49 with annular grooves 51 and 52 which are adapted to receive the ends of the pins 53 carried in suitable recesses 54 in the stud 50. In order to hold the ends of the pins 53 in the grooves 51 and 52, springs 55 are provided in the recesses back of the pins 53. For the purpose of facilitating the removal of the shaft 44 from the stud 50 I provide the shaft with openings 56 which communicate with the grooves 51 and 52, as shown in Fig. 5, and permit the insertion of a device for pushing the pins 53 out of the grooves.

A shaft 57 is mounted in a bearing 58 carried by the frame 10 and is splined in the gear 48. The shaft 57 carries a bevel gear 59 which meshes with a segmental bevel gear 60 arranged on one arm of a rocking lever 61. The lever 61 is pivotally mounted at 62 on a suitable bracket 63 and carries a cam roller 64, which is arranged in a cam groove 65 in the side of the driving wheel 25. The cam groove 65 is of such shape as to give the proper rocking movement to the shafts 44 to lift the tool T out of the tooth space when the ram starts on its return stroke.

It will be seen that the mechanism for lifting the tool out of the tooth space is comparatively simple and does not interfere in any way with the operation of the tool support.

In order to insure the return of the tool holder to the proper position for the forward or cutting stroke, I arrange on the arm 18 a laterally projecting post 66 to which is connected one end of a spring 67, the other end of this spring being secured to the post 68 on the tool support.

For the purpose of effecting a relative adjustment of the pivot 30 and the blank support to thereby vary the angle of the cut, I have provided the means for adjusting the block 32. It will be evident that the path of movement of the tool will depend on the relation of the pivot 30 to the pivot 29 and by shifting the block 32 by means of the screws 40 and 41 the pivot 30 which is carried by the block 32 will be adjusted relative to the pivot 29. When the pivot 30 is in the proper position the screws 37 are tightened and the block 32 thus clamped. The block 32 is formed on an arc about the pivot 29 so that during the adjustment of the block the position of the tool support 14 will not be disturbed.

In the operation of the machine the reciprocation of the ram 11 causes the tool support 14 to move back and forth across the head 12, the pivot 29 which is carried by the tool support moving in an arc or oscillating about the pivot 30 as a center. The parts carried by the tool support 14 will move with it and the whole support will therefore move in a curved path, the motion being one of pure translation.

It will be observed that the path of any point of the tool, while making a complete cut across the face of the gear is a curve in a horizontal plane; and that the axis of the pivot 30 is perpendicular to the plane determined by said curved path. Hence as the above stated relation holds for each and every point of the tool, it may be said that the axis of the pivot is perpendicular to the plane determined by the curve of the cut. Moreover, if a plane is passed through an element in the surface of the face of the gear blank, tangential to the face, and the element is taken through the point where the tool is beginning a cut, it will be noted that the axis of the pivot is substantially perpendicular to such a plane. That is to say, the axis of the pivot is substantially perpendicular to a plane tangential to the face of the blank where the cut is being made.

While I have shown and described what I now consider to be the preferred form of my invention, it will be understood that various changes can be made in the details of construction within the scope of the claims, and therefore I do not wish to be limited to the exact details shown and described.

Having thus described my invention, what I claim is:

1. In a gear cutting machine, the combination of a frame, a reciprocating ram on the frame, a tool support slidably mounted on the ram, a link connected with a normally fixed pivot, and a pivotal connection between said link and said support 2. In a gear cutting machine, the combination of a frame, a reciprocating ram on the frame, a tool support arranged to slide on the ram transversely of the line of movement thereof, a link connected with a normally fixed pivot, and a pivotal connection between said link and said support.

3. In a gear cutting machine, the combination of a frame, a reciprocating ram on the frame, a tool support arranged to slide on the ram at right angles to the direction of movement thereof, a link connected with a normally fixed pivot, and a pivotal connection between said link and said support.

4. In a gear cutting machine, the combination of a frame, a reciprocating ram on the frame, a tool support slidably mounted on the ram, an adjustable, normally fixed pivot, a link connected with said pivot, and a pivotal connection between said link and said support.

5. In a gear cutting machine, the combination of a frame, a reciprocating ram on the frame, a tool support arranged to slide on the ram at right angles to the line of movement thereof, an adjustable, normally fixed pivot, a link connected with said pivot, and a pivotal connection between said link and said support.

6. In a gear cutting machine, the combination of a frame, a reciprocating ram on the frame, a tool support slidably mounted on the ram, a member adjustable along the arc of a circle, a link pivotally connected with said member, and a pivotal connection between said link and said support.

7. In a gear cutting machine, the combination of a frame, a reciprocating ram on the frame, a tool support slidably mounted on the ram, a normally fixed pivot, a link connected with said pivot, a pivotal connection between said link and said support, and means for adjusting said normally fixed pivot about said pivotal connection as a center.

8. In a gear cutting machine, the combination of a frame, a reciprocating ram on the frame, a tool support slidably mounted on the ram, a normally fixed member provided with a pivot, a link connected with said pivot, a pivotal connection between said link and said support, and a pair of opposed screws for adjusting the position of said member.

9. In a gear cutting machine, the combination of a frame, means for supporting the gear blank, a pivot on said frame, a tool supporting member adapted to oscillate about said pivot in making the cut, and means whereby a relative adjustment of said pivot and said blank support may be effected.

10. In a gear-cutting machine, the combination of a frame, means for supporting a gear blank, a pivot on said frame, a tool-supporting member movable with reference to said pivot so as to effect a curved cut across the face of the blank in the form of a circular arc, and means whereby a relative adjustment of said pivot and said blank support may be effected.

11. In a gear-cutting machine, the combination of a frame, means for supporting a gear blank, a pivot on said frame, a tool-supporting member movable with reference to said pivot so as to effect a curved cut across the face of the blank in the form of a circular arc, means for moving the blank and support so as to generate the teeth, and means whereby a relative adjustment of said pivot and said blank support may be effected to vary the arrangement of the teeth cut in the blank.

12. In a gear cutting machine, the combination with the frame and means for supporting the blank, of a tool supporting member, a pivot on the frame, an arm mounted on said pivot and connected to the tool support, and means for oscillating the arm on said pivot to cause the tool supporting member to move in a curved path.

13. In a gear cutting machine, the combination with the frame and means for supporting the blank, of a tool supporting member, a pivot on the frame, an arm mounted on said pivot and connected to the tool support, and means connected to the tool support to move the latter back and forth and causing an oscillation of said arm, whereby the tool support is caused to move in a curved path, for the purpose described.

14. In a gear cutting machine, the combination with the frame and means for supporting the blank, of a tool supporting member, a pivot on the frame, an arm mounted on said pivot and connected to the tool support, and means having a sliding connection with the tool support to move the latter back and forth, whereby the tool support is caused to move in a translatory path.

15. In a gear cutting machine, the combination of a frame, means for supporting a gear blank, a tool supporting member, a pivot on said frame, means including said pivot for constraining said member to movement in a curved path, whereby a curved cut may be made across the face of the blank on said supporting means, the axis of said pivot being perpendicular to the plane determined by the curve of said cut.

16. In a gear cutting machine, the combination of a frame, means for supporting a gear blank to be cut, a pivot on said frame substantially perpendicular to a plane tangential to the face of the blank where the cut is being made, a tool supporting member movable with reference to said pivot so as to effect a curved cut in the blank in the form of a circular arc and means whereby a relative adjustment of said pivot and said blank support may be effected.

In testimony whereof I affix my signature in presence of two witnesses.

HENRY A. GARVEY.

Witnesses:
LE ROI J. WILLIAMS,
E. GROAT.